US007158664B2

(12) United States Patent
Nagaoka et al.

(10) Patent No.: US 7,158,664 B2
(45) Date of Patent: Jan. 2, 2007

(54) IMAGE RECOGNITION APPARATUS

(75) Inventors: Nobuharu Nagaoka, Nasu-gun (JP); Takayuki Tsuji, Utsunomiya (JP); Hiroshi Hattori, Utsunomiya (JP); Kouzou Simamura, Shioya-gun (JP); Masahito Watanabe, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 734 days.

(21) Appl. No.: 10/286,541

(22) Filed: Nov. 1, 2002

(65) Prior Publication Data
US 2003/0091228 A1   May 15, 2003

(30) Foreign Application Priority Data
Nov. 9, 2001 (JP) ............................. 2001-345105

(51) Int. Cl.
G06K 9/00 (2006.01)
G06K 9/40 (2006.01)
(52) U.S. Cl. .................... 382/154; 382/103; 382/266
(58) Field of Classification Search ................ 382/154, 382/103, 266
See application file for complete search history.

(56) References Cited
U.S. PATENT DOCUMENTS
3,674,369 A * 7/1972 Hobrough .................... 356/2
4,573,191 A * 2/1986 Kidode et al. .............. 382/106
5,606,627 A * 2/1997 Kuo ........................... 382/154
5,768,404 A * 6/1998 Morimura et al. .......... 382/107
5,917,940 A * 6/1999 Okajima et al. ............. 382/173
6,005,987 A * 12/1999 Nakamura et al. .......... 382/294
6,259,426 B1 * 7/2001 Harada et al. .............. 345/581
6,263,100 B1 * 7/2001 Oshino et al. .............. 382/154
6,381,360 B1 * 4/2002 Sogawa ...................... 382/154

FOREIGN PATENT DOCUMENTS
JP      06-266828       9/1994
JP      09-226490       9/1997
JP      EP1223083   *   9/2000
JP      2001-338281     12/2001
WO      WO200121446 *   3/2001

* cited by examiner

Primary Examiner—Bhavesh M Mehta
Assistant Examiner—Utpal Shah
(74) Attorney, Agent, or Firm—Carrier, Blackman & Associates, P.C.; Joseph P. Carrier; William D. Blackman

(57) ABSTRACT

An image processing unit determines the size of a circumscribed quadrangle of the target object, and predicts the overlap of the two different objects. If overlap is predicted, the target object is divided into two divided regions L_b and R_b containing the left and right edges of the target object respectively, and by performing a correlation calculation between the left image and the right image captured by a stereo camera for each of the divided regions, the parallaxes of the respective divided regions L_b and R_b can be determined. Then, if the absolute value of the difference between the parallaxes of the respective divided regions L_b and R_b is greater than a predetermined value, a determination is made that different objects are overlapping within the target object, and the target object is divided for recognition, and the distance to the respective objects is calculated independently.

5 Claims, 14 Drawing Sheets

THE OBJECTS WITHIN THE FRAMES P1
THROUGH P4 ARE TARGET OBJECTS.

RIGHT IMAGE

LEFT IMAGE

IMAGE RECOGNITION APPARATUS

BACKGROUND OF THE INVENTION

1. Field of the Invention

The present invention relates to an image recognition apparatus for calculating the distance to a target object based on a binocular stereovision image obtained using two imaging devices.

2. Description of the Related Art

Conventionally, in order to notify the driver of a vehicle about an obstacle such as a pedestrian in its path, devices in which images taken by one or a plurality of cameras mounted on the front of the vehicle are displayed at a position visible from the driver's seat to complement the forward visibility of the driver, and devices which detect obstacles which may contact the vehicle based on the images taken by the cameras, and cause the vehicle to perform automatic avoidance operations, are already known. The image displayed to the driver is displayed on an image display apparatus such as a NAVIDisplay positioned in the console of the vehicle, a HUD (Head Up Display) which displays information at a position on the front window which does not obscure the forward visibility of the driver, or a meter integrated display which is integrated with a meter which displays the travel state of the vehicle numerically. Furthermore, the automatic avoidance operations of the vehicle are performed by automatically controlling a variety of actuators which are provided to operate each section of the vehicle.

An example of this type of apparatus in which an image is taken of the environment in the vicinity of the vehicle, and obstacles which may contact the vehicle are detected from the captured image, is disclosed in Japanese Unexamined Patent Application, First Publication No. Hei 6-266828. In this apparatus, the images taken by two cameras are processed, and information on the distance distribution across the entire image is obtained, and by then calculating three dimensional positional information of target objects corresponding with the distance distribution information, the shape of the road and obstacles such as side walls are easily and accurately detected. Consequently, it is possible to individually recognize the presence of a plurality of obstacles, and either warn the driver of the vehicle, or have the vehicle perform automatic avoidance operations with a high degree of reliability.

However, conventional apparatuses such as those described above have a problem in that, when determining the distance distribution across the entire image, because the entire image is divided into regions of a certain size and the distance distribution is calculated for each region, the size of the region relative to the size of the target object is fixed, and the processing efficiency is thus poor.

In other words, when the captured image of a target object occupies a large proportion of the entire image, because only a single distance to the target object need be obtained, if the target object is divided up more than necessary and the distance distribution for each region is determined, the efficiency of the processing is poor, and considerable time is required for the entire distance distribution to be calculated in order to calculate the distance to the target object.

SUMMARY OF THE INVENTION

In view of the above circumstances, an object of the present invention is to provide an image recognition apparatus which while taking into consideration the size of a target object in an image taken by the cameras, determines the presence of overlapping of different objects in the image using the parallax of the image, and when objects are overlapping, independently calculates the distances to the respective objects.

In order to solve the problems described above, an image recognition apparatus according to the present invention is an image recognition apparatus which measures the parallax of a target object based on images respectively obtained by two imaging devices and calculates the distance to the target object based on the parallax, comprising an image determination device (for example step S26 through step S30 in the embodiment of the invention) which sets determination regions which have sufficient height to include the target object and independently contain left and right edges of the target object respectively, and determines whether different objects are overlapping by measuring and comparing the parallaxes of the respective determination regions.

Using the image determination device, the image recognition apparatus sets a region for each target object, taking into consideration the different heights of the captured objects, so as to include the left or the right edge of the target object, and by comparing the parallaxes of these regions, obtains comparison results indicating whether the parallaxes of the left and right edges coincide or differ. Consequently, a determination can be made as to whether the left portion and the right portion of a target object are portions of the same object, or are portions of different objects, enabling the presence of overlapping objects to be determined.

Consequently, because the region used to determine the parallaxes is set depending on the size of each captured target object, the parallaxes can always be determined efficiently regardless of the size of the captured target object corresponding to the distance between the vehicle and the target object.

In the aforementioned image recognition apparatus, the image determination device may include an image separation device (for example step S30 in the embodiment of the invention) which, in those cases where the overlapping of different objects is recognized, sets distance determination points in the determination regions upon the edges of the determination regions, and independently calculates the distance to each of the respective objects.

When a target object is recognized by the image determination device as representing a plurality of different overlapping objects, the image recognition apparatus can calculate the distance to the respective objects using the respective left and right edges of the target object as the distance determination points, thereby separating and capturing the objects.

Consequently, situations in which the distance to a target object cannot be calculated because the presence in the image of different objects in a state of overlap causes the parallaxes of the target object to be different at different locations can be prevented, and it becomes possible to accurately determine the distance to each different object.

The image recognition apparatus may comprise an image prediction device (for example step S21 in the embodiment of the invention) which predicts the overlap of different objects if a region surrounding the target object is larger than a predetermined size, or a ratio of a length in the vertical direction to a length in the horizontal direction of the region surrounding the target object is less than a predetermined value.

Before determining whether different objects are overlapping by using the image determination device, the image recognition apparatus can also make a prediction using the image prediction device as to whether or not the target object comprises different overlapping objects, using the size of the region surrounding the target object, or the ratio of the length in the vertical direction to the length in the horizontal direction of the region surrounding the target object, and then conduct a determination using the image determination device only if the target object is predicted to comprise different overlapping objects (only if the possibility is high).

Consequently, because the calculations of the image determination device are only executed when there is a high possibility that the target object comprises different overlapping objects, the processing load in the image recognition apparatus can be reduced.

In the image recognition apparatus, the image determination device may set calculation regions containing the determination regions on the periphery of each determination region respectively, and calculate the parallaxes by performing a correlation calculation between the calculation regions corresponding with respective images obtained by the two imaging devices.

In the image recognition apparatus, the image determination device may determine that different objects are overlapping when an absolute value of a difference between the parallax of the determination region containing the aforementioned left edge and the parallax of the determination region containing the aforementioned right edge is greater than a predetermined value.

DETAILED DESCRIPTION OF THE PREFERRED EMBODIMENTS

The embodiments of the present invention are described below with reference to the drawings.

Figure 1:
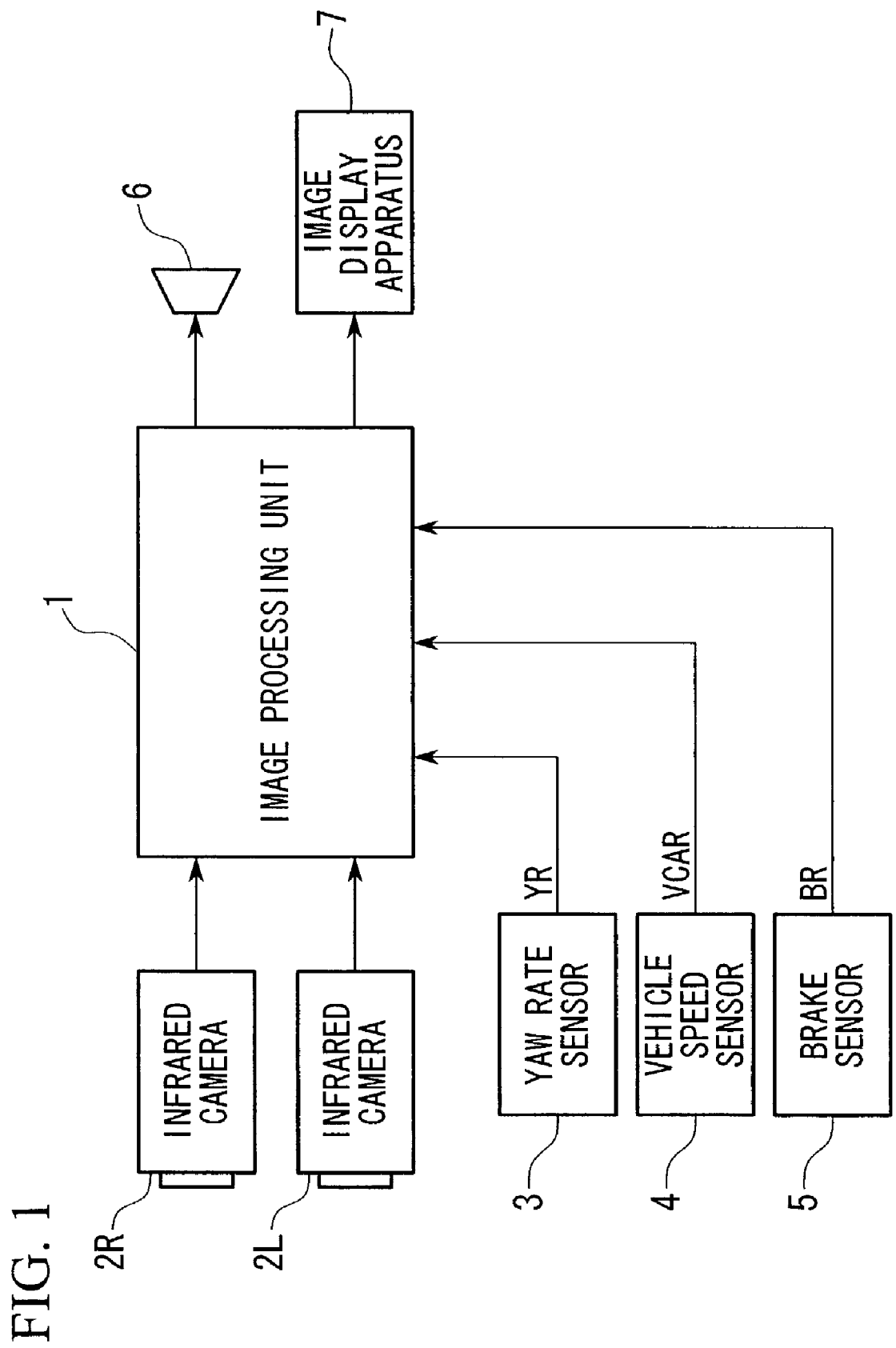
FIG. 1 is a block diagram showing the structure of an image recognition apparatus according to an embodiment of the present invention.

FIG. 1 is a block diagram showing the structure of an image recognition apparatus according to an embodiment of the present invention.

In FIG. 1, reference numeral 1 is an image processing unit comprising a CPU (central processing unit) which controls the image recognition apparatus of this embodiment, to which are connected two infrared cameras 2R and 2L which can detect far infrared radiation, a yaw rate sensor 3 which detects the yaw rate of the vehicle, a vehicle speed sensor 4 which detects the traveling speed (vehicle speed) of the vehicle, and a brake sensor 5 which detects the operation of the brakes. In this configuration, the image processing unit 1 detects a moving object such as a pedestrian or animal in front of the vehicle based on an infrared image of the vicinity of the vehicle and signals which indicate the travel state of the vehicle, and issues a warning when it is determined that the possibility of a collision is high.

Furthermore, a speaker 6 for issuing a warning by speech, and an image display apparatus 7 including, for example, a meter integrated display having an integrated meter for showing numerically the travel state of the vehicle, a NAVIDisplay mounted in the console of the vehicle, or a HUD (head up display) 7a (see FIG. 2) which displays information at a position on the front window at a position which does not obscure the forward visibility of the driver, which displays the image taken by the infrared cameras 2R and 2L and allows the driver of the vehicle to recognize objects which present a collision danger, are also connected to the image processing unit 1.

Furthermore, the image processing unit 1 comprises an A/D conversion circuit which converts input analog signals into digital signals, an image memory which stores the digitized image signal, a CPU (Central Processing Unit) which performs various operation processes, RAM (Random Access Memory) which is used by the CPU to store data which is being processed, ROM (Read Only Memory) for storing tables, maps, programs executed by the CPU, and the like, and an output circuit which outputs a drive signal for the speaker 6 and a display signal for the HUD 7a or the like. The image processing unit 1 is structured so that the output signals of the infrared cameras 2R and 2L, the yaw rate sensor 3, the vehicle speed sensor 4, and the brake sensors 5 are converted to digital signals and then input into the CPU.

Figure 2:
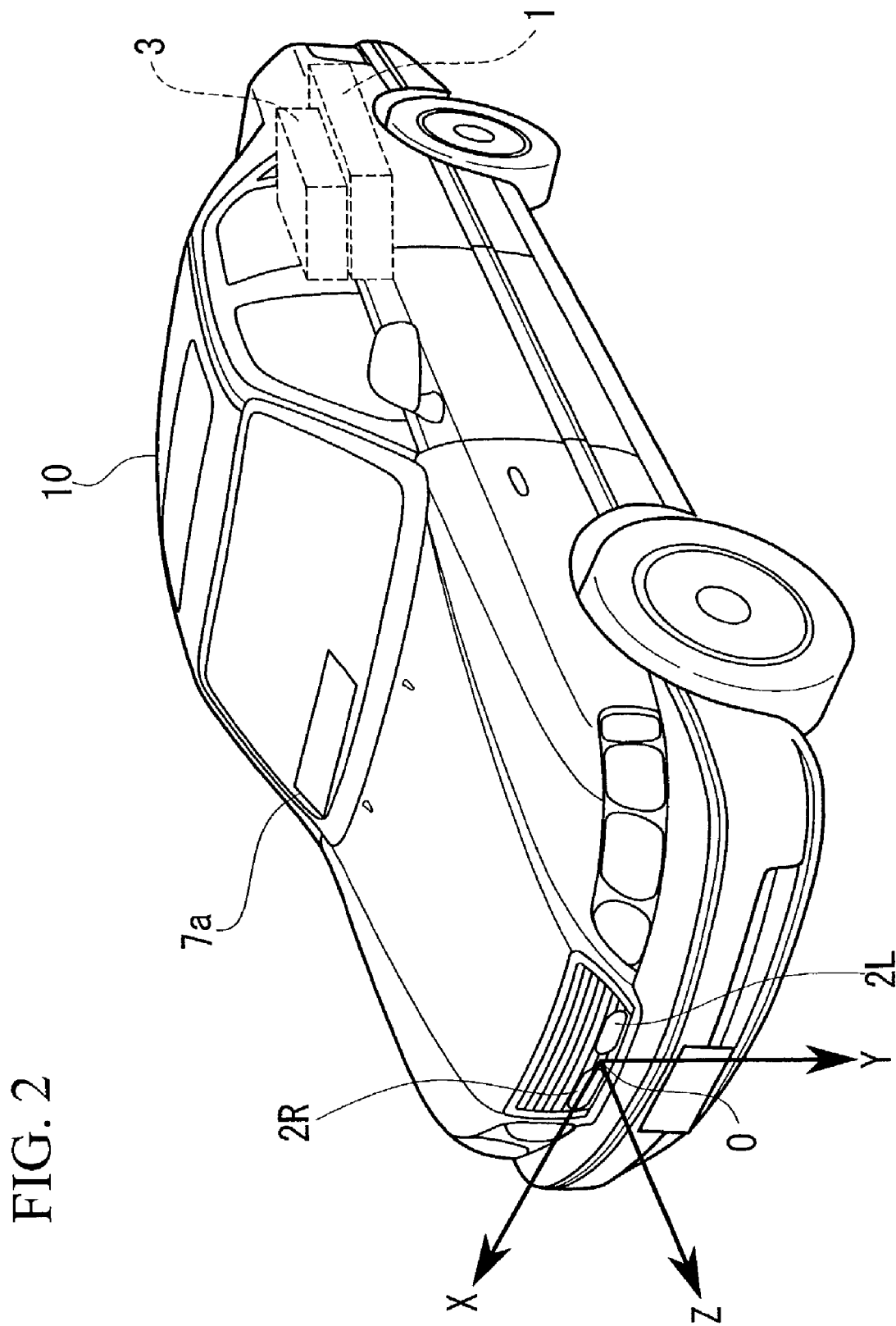
FIG. 2 is a diagram showing mounting positions of infrared cameras, a sensor, and a display and the like on a vehicle.

Furthermore, as shown in FIG. 2, the infrared cameras 2R and 2L are mounted to the front of the vehicle 10 at substantially symmetrical positions relative to the center in the transverse direction of the vehicle 10, the optical axes of the two infrared cameras 2R and 2L are parallel to each other, and both of the cameras are fixed at equal heights above the surface of the road. A characteristic of the infrared cameras 2R and 2L is that the output signal level becomes higher (the brightness increases) as the temperature of the target object increases Furthermore, the HUD 7a is mounted so that the display screen is displayed at a position on the front window of the vehicle 10 which does not obscure the forward visibility of the driver.

Next, the operation of the present embodiment is described with reference to the drawings.

Figure 3:
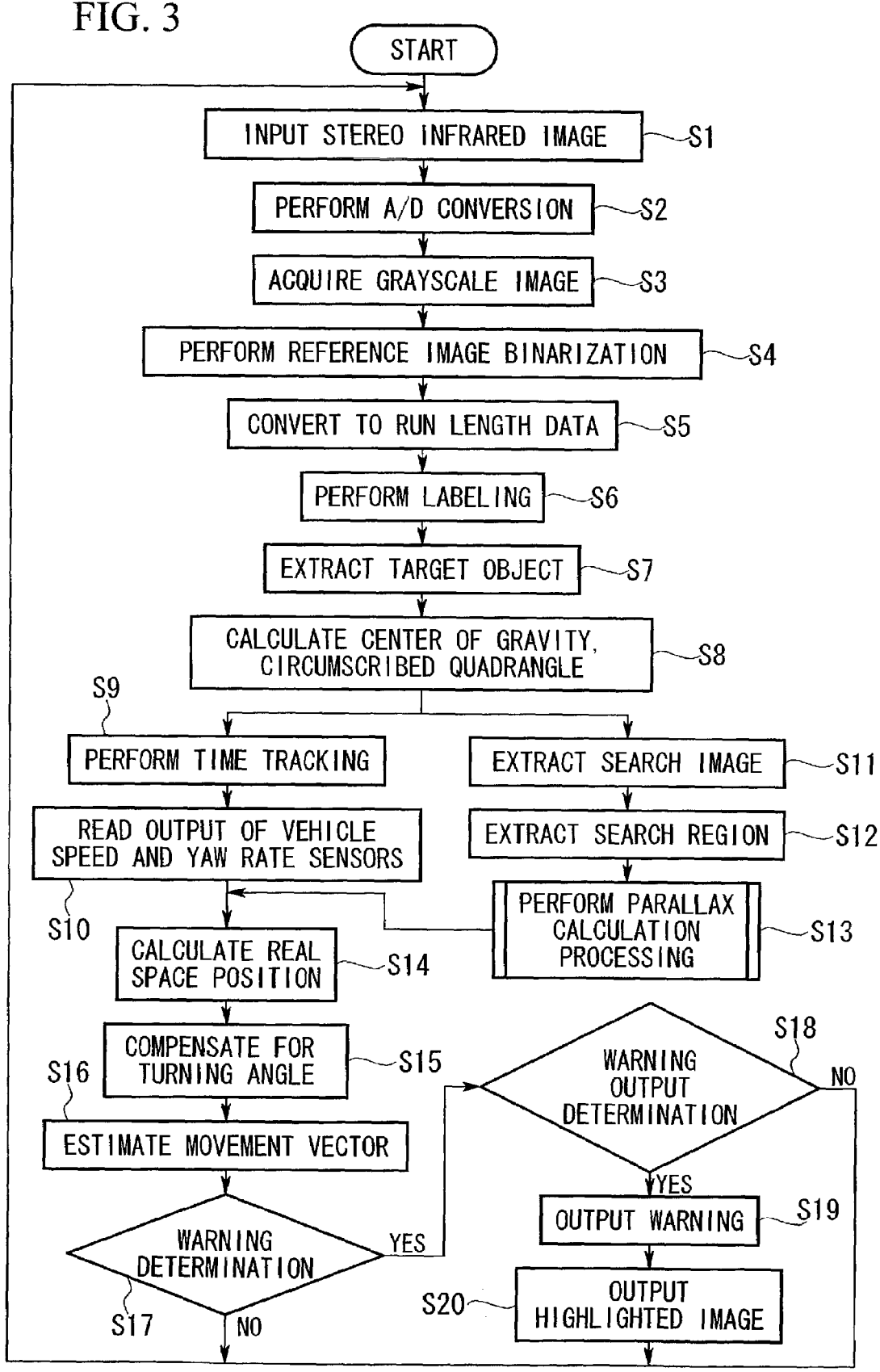
FIG. 3 is a flowchart showing the entire operation of the image recognition apparatus according to the same embodiment.

FIG. 3 is a flowchart showing the processing sequence in the image processing unit 1 provided in the image recognition apparatus according to the present embodiment.

First, the image processing unit 1 captures the infrared image, which is the output signal of the infrared cameras 2R and 2L (step S1), performs an A/D conversion thereon (step S2), and stores the gray scale image in the image memory (step S3). Here, the right image is obtained by the infrared camera 2R and the left image is obtained by the infrared camera 2L. Furthermore, because the horizontal position of the same target object on the display screen is displayed out of horizontal shift in the right image and the left image, the distance to the target object can be calculated using this shift (parallax).

Next, the right image obtained from the infrared camera 2R is deemed the reference image, and binary processing is performed on this image signal. In this binary processing, a "1" (white) is assigned to a region brighter than a brightness threshold value ITH, and a "0" (black) is assigned to a darker region (step S4).

Figure 4A:
FIG. 4A is a diagram showing a grayscale image obtained by an infrared camera.
Figure 4B:
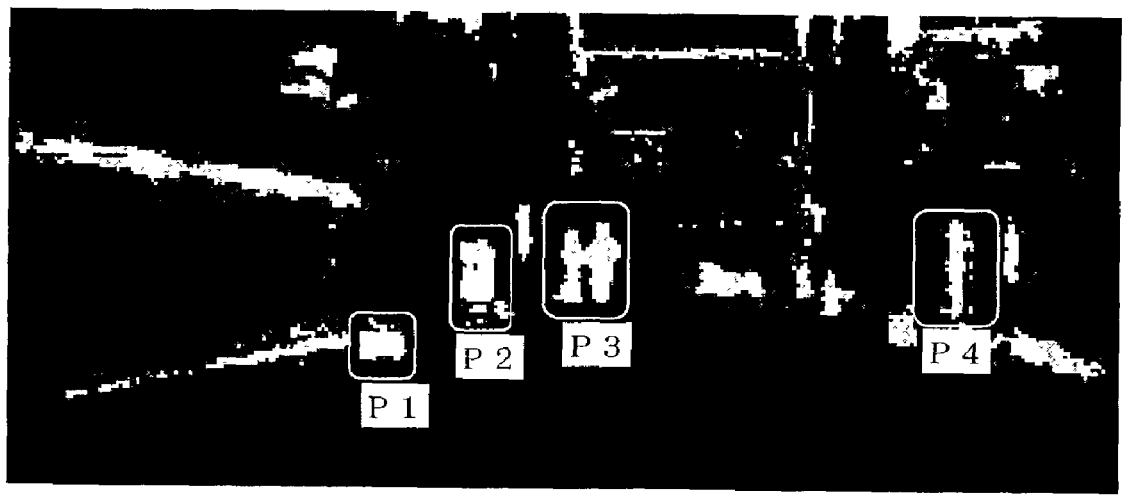
FIG. 4B is a diagram showing a binary image of the grayscale image obtained by the infrared camera.

FIG. 4A shows a gray scale image obtained by the infrared camera 2R, and by performing binary processing on this image, the image shown in FIG. 4B is obtained. In FIG. 4B, the objects within the frames P1 through P4 are deemed the target objects and are displayed as white (referred to as "high brightness regions" below) on the display screen.

Once the binary image data from the infrared images is obtained, processing is performed in which the binary image data is converted to run length data (step S5).

Figure 5A:
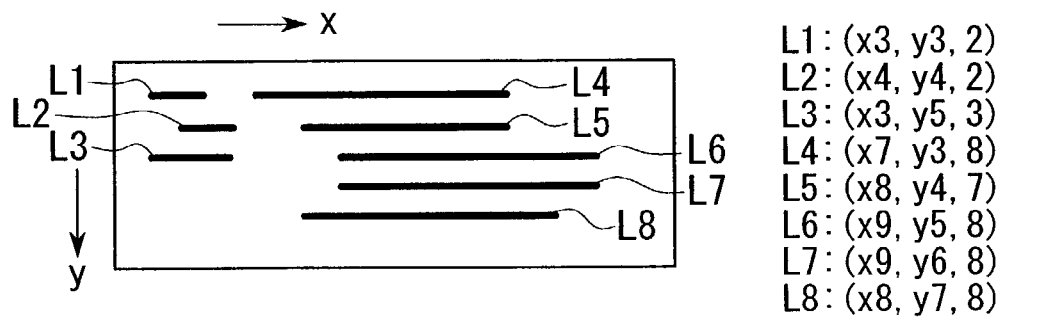
FIGS. 5A through 5C are diagrams showing the conversion processing to run length data, and labeling.

FIG. 5A is a diagram which describes this process, and in this diagram the regions which have become white due to binary processing are shown as the lines L1 to L8 in pixel units. The lines L1 to L8 all have a width of 1 pixel in the y direction, and while they are actually arranged without a space therebetween in the y direction, they have been separated for ease of description. Furthermore, the lines L1 to L8 have lengths of 2 pixels, 2 pixels, 3 pixels, 8 pixels, 7 pixels, 8 pixels, 8 pixels, and 8 pixels in the x direction, respectively. The run length data includes the coordinates of the start point of each of the lines (the leftmost point of each line) and the length (number of pixels) from the start point to the end point (the rightmost point of each line) of the lines L1 to L8. For example, the line L3 comprises the 3 pixels (x3, y5), (x4, y5), and (x5, y5), and thus (x3, y5, 3) becomes the run length data.

Figure 5B:
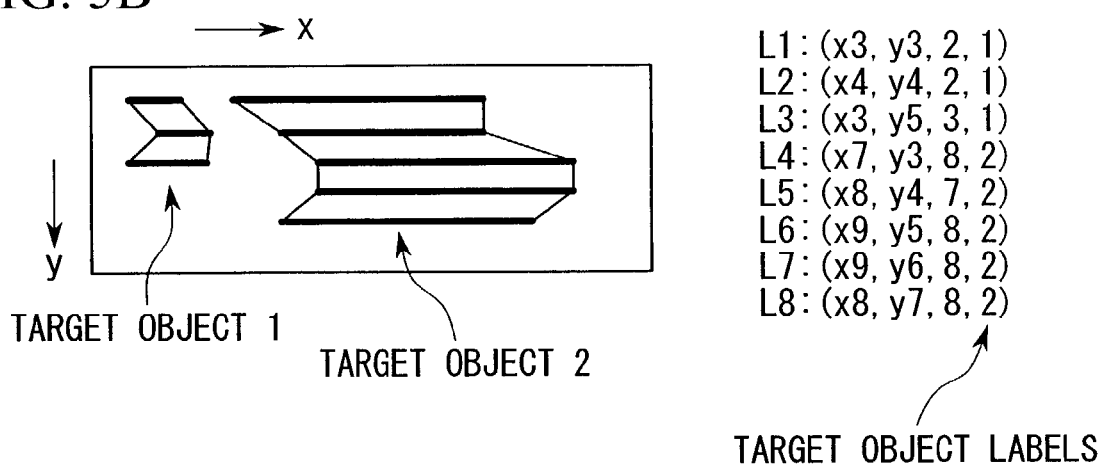

Next, by labeling the target objects based on the image data converted into run length data (step S6), the processing in which the target objects are extracted is performed (step S7). In other words, as shown in FIG. 5B, of the lines L1 to L8 which have been converted to run length data, the lines L1 to L3, which have portions which overlap in the y direction, are considered to be one target object 1, and lines L4 to L8 are considered to be one target object 2, and the target object labels 1 and 2 are appended to the run length data. By performing this processing, for example, the high brightness regions shown in FIG. 4B are recognized as target objects 1 through 4 respectively.

Figure 5C:
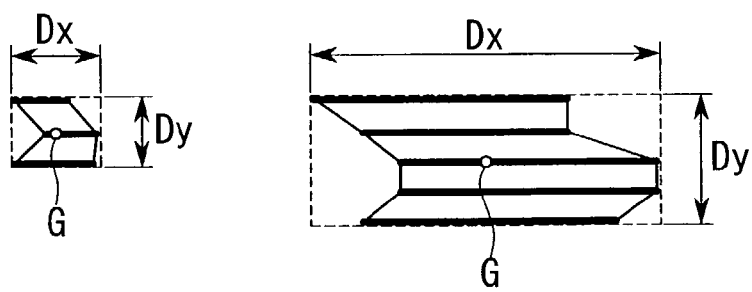

Once the extraction of the target objects is completed, as shown in FIG. 5C, the center of gravity G, the surface area S, and the aspect ratio ASPECT of the circumscribed quadrangle represented by the broken lines are calculated for each of the extracted target objects (step S8).

Here, the surface area S is calculated by adding the lengths of the run length data for the same target object using a formula (1) below. If the run length data of the target object A is (x [i], y [i], run [i], A) (i=0, 1, 2, ..., N−1), then $$S = \sum_{i=0}^{N-1} (run[i] - 1) \quad (1)$$

Furthermore, the coordinates (xc, yc) of the center of gravity G of the target object A are calculated using formulas (2) and (3) below, which take into consideration the length of the run length data.

$$xc = \frac{1}{S} \cdot \sum_{i=0}^{N-1} (x[i] + (run[i] - 1)/2) \cdot (run[i] - 1) \quad (2)$$

$$yc = \frac{1}{S} \cdot \sum_{i=0}^{N-1} y[i] \cdot (run[i] - 1) \quad (3)$$

In addition, the aspect ratio ASPECT is calculated as the ratio Dy/Dx of the values Dy and Dx shown in FIG. 5C.

As shown in the formulas (1), (2) and (3), the run length data is expressed as a number of pixels (number of coordinates) run [i], and consequently 1 must be subtracted to obtain the actual length. Furthermore, the position of the center of gravity G can be substituted with the position of the center of gravity of the circumscribed quadrangle.

Figure 6A:
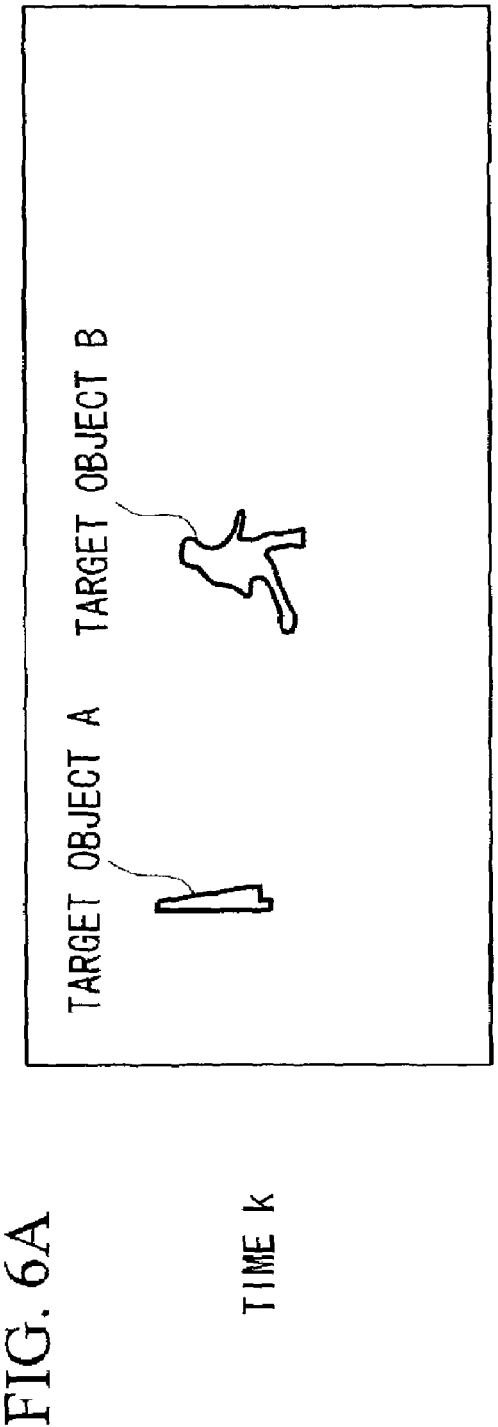
FIG. 6A and FIG. 6B are diagrams showing the time tracking of a target object.

Once the center of gravity, the surface area, and the aspect ratio of the circumscribed quadrangle of the target object have been calculated, time tracking of the target object, or in other words recognition of the same target object in each sampling cycle, is performed (step S9). In time tracking, the time at which a time t, which is an analogue value, is digitized in a sampling cycle is termed k, and when the target objects A and B are extracted at time k as shown in FIG. 6A, a determination of identification of the target objects C and D extracted at time k+1 is performed with the target objects A and B. Specifically, when the following conditions of identification determination 1) to 3) are satisfied, the target objects A and B are determined to be the same as the target objects C and D, and the labels of the target objects C and D are changed to show target objects A and B, respectively. As a result, time tracking is performed.

1) If the coordinates of the position of the center of gravity of the object i (=A, B) in the image at time k are (xi (k), yi (k)) respectively, and the coordinates of the position of the center of gravity of the object j (=C, D) in the image at time k+1 are (xj (k+1), yj (k+1)), then |xj (k+1)−xi (k)|<Δx|yj (k+1)−yi (k)|<y, where Δx and Δy denote the allowable values of the amount of movement in the image in the x direction and the y direction respectively.

2) If the surface area of the object i (=A, B) in the image at time k is Si (k) and the surface area of the object j (=C, D) in the image at time (k+1) is Sj (k+1), then Sj (k+1)/Si (k)<1±ΔS, where ΔS denotes the allowable range of variation in the surface area.

3) If the aspect ratio of the circumscribed quadrangle of the object i (=A, B) at time k is ASPECT i (k), and the aspect ratio of the circumscribed quadrangle of the object j (=C, D) at time (k+1) is ASPECT j (k+1), then ASPECT j (k+1)/ASPECT i (k)<1±Δ ASPECT, where Δ ASPECT denotes the allowable range of variation in the aspect ratio.

Figure 6B:
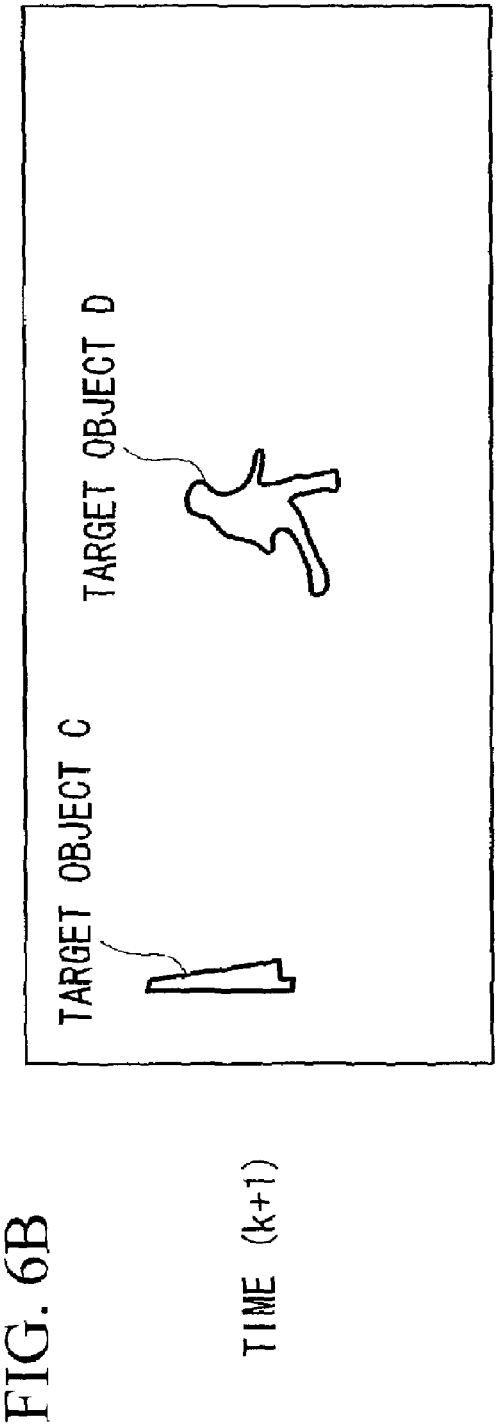

For example, when comparing FIG. 6A and FIG. 6B, although the sizes of each of the target objects in the image are larger in FIG. 6B, because the target object A and the target object C fulfill the requirements for identification determination described above, and the target object B and the target object D also fulfill the requirements for identification determination described above, the target objects C and D are recognized as the target objects A and B respectively. In this manner, the position coordinates (of the center of gravity) of each of the recognized target objects are stored in the memory as time series position data to be used in later calculation processing.

The processing in steps S4 to S9 described above is performed on a binary reference image (in this embodiment, the right image).

Figure 7:
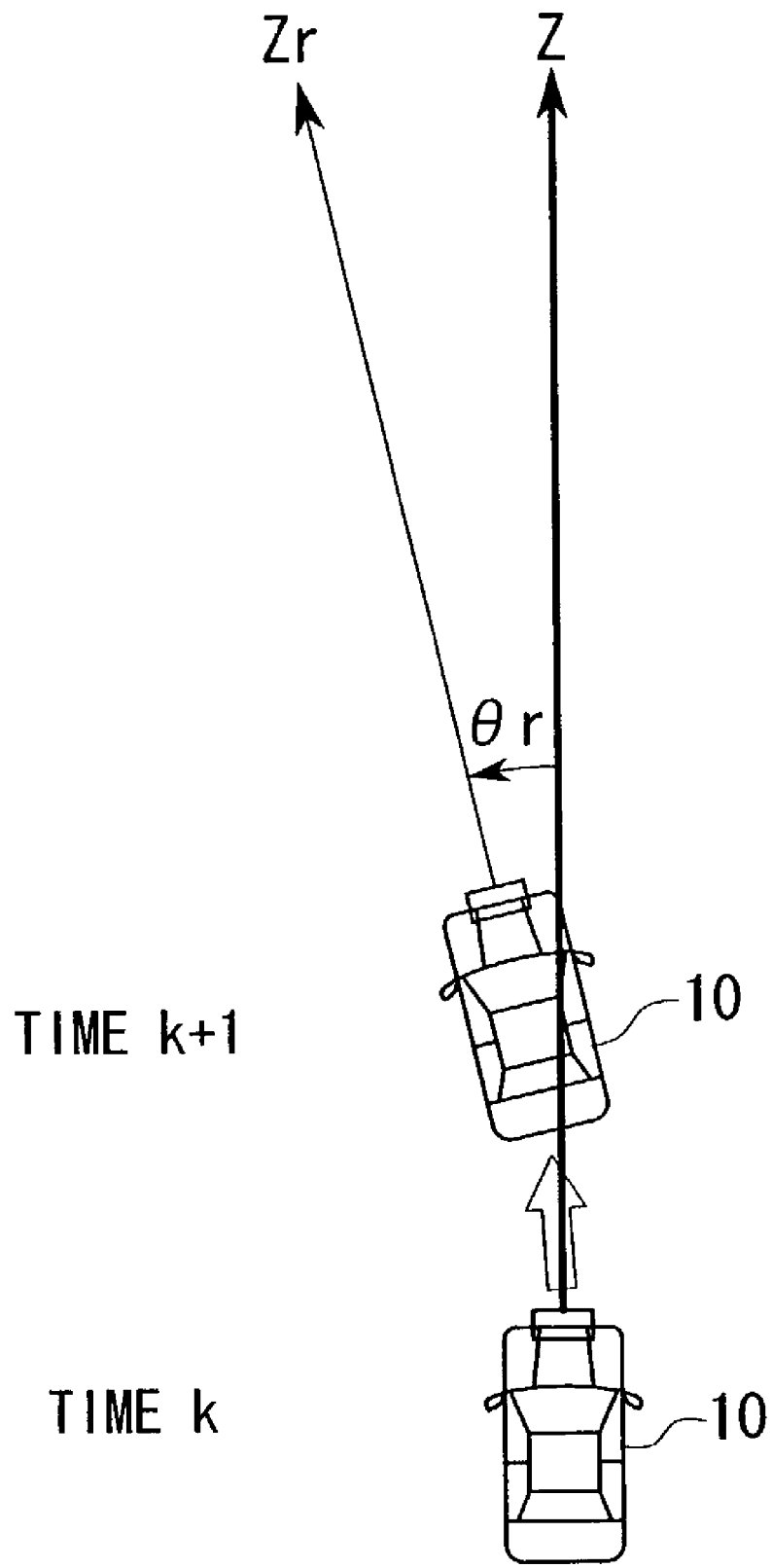
FIG. 7 is a diagram showing the turning angle compensation of a target image.

Next, the vehicle speed VCAR detected by the vehicle speed sensor 4 and the yaw rate YR detected by the yaw rate sensor 3 are read, and as shown in FIG. 7, the turning angle θr of the vehicle 10 is calculated by performing a time integration of the yaw rate YR (step S10).

On the other hand, processing which calculates the distance z between the target object and the vehicle 10 is performed in steps S11 through S13, in parallel with the processing in step S9 and step S10. Because these calculations require a longer time than step S9 and step S10, they are executed with a longer cycle than step S9 and step S10 (for example with a cycle which is about three times as long as the execution cycle of steps S1 to S10).

Figure 8A:
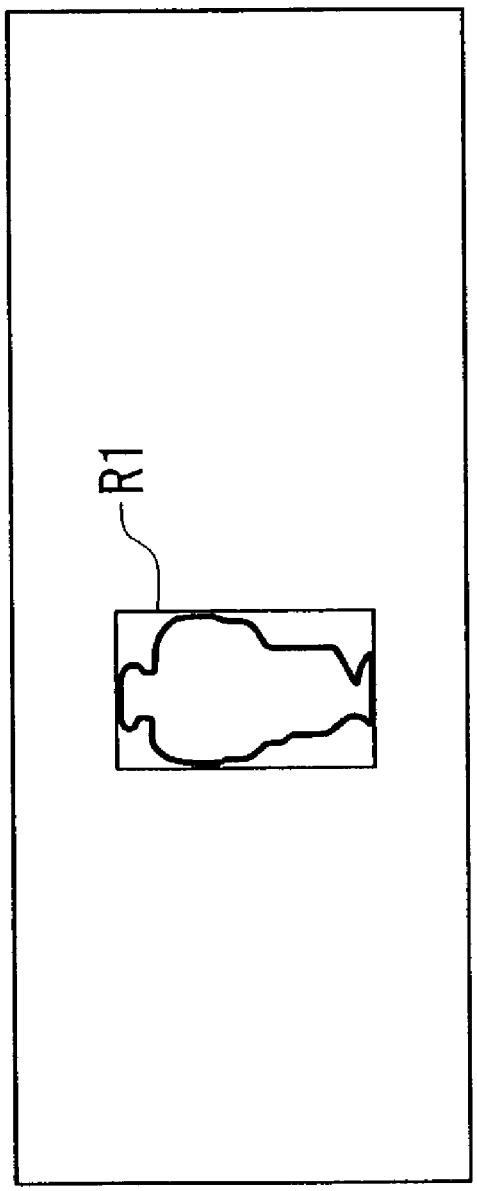
FIG. 8A is a diagram showing a search region set in a search image within the right image.

First, by selecting one of the target objects tracked by the binary image of the reference image (the right image), a search image R1 (here, the entire region surrounded by the circumscribed quadrangle is deemed the search image) is extracted from the right image (step S11) as shown in FIG. 8A.

Figure 8B:
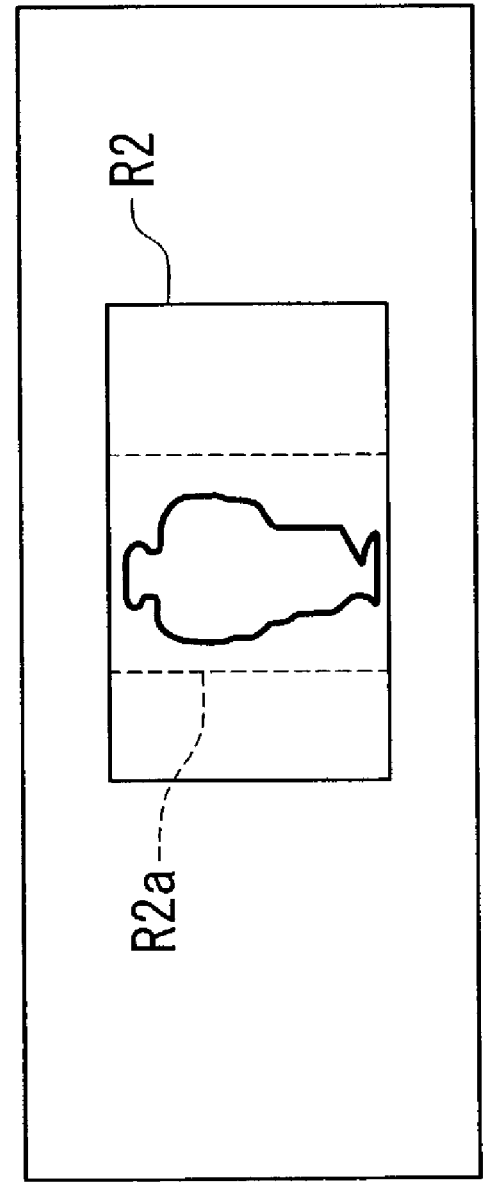
FIG. 8B is a diagram showing the search region set in the left image.

Next, a search region is set for searching for an image (referred to as the "corresponding image" below) within the left image which corresponds to the search image, and the corresponding image is extracted by executing a correlation calculation (step S12). Specifically, as shown in FIG. 8B, the search region R2 in the left image is set in accordance with each of the vertex coordinates of the search image R1, and the brightness difference total value C (a, b), which indicates the degree of correlation with the search image R1 in the search region R2, is calculated by a formula (4) shown below, and the region in which this total value C (a, b) is smallest is extracted as the corresponding image. This correlation calculation is performed using the gray scale image rather than the binary image.

Furthermore, if there is historical position data for the same target object, a region R2a (indicated by the broken lines in FIG. 8B) which is smaller than the search region R2 is set as the search region based on this position data.

$$C(a, b) = \sum_{n=0}^{N-1} \sum_{m=0}^{M-1} |IL(a + m - M, b + n - N) - IR(m, n)| \quad (4)$$

Figure 9:
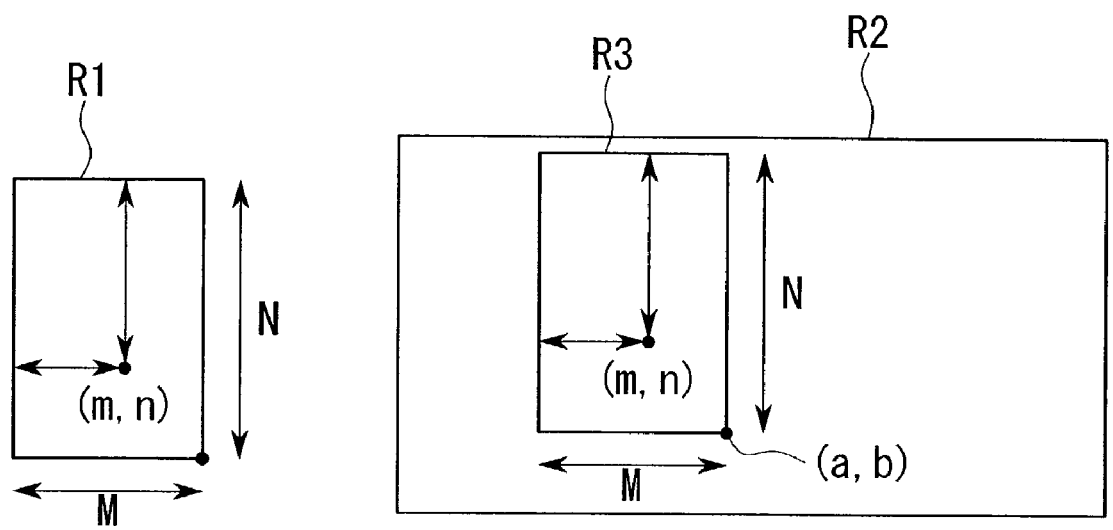
FIG. 9 is a diagram showing the correlation calculation processing performed on the search region.

Here, IR (m, n) is the brightness value at the position of the coordinates (m, n) in the search region R1 shown in FIG. 9, and IL (a+m−M, b+n−N) is the brightness value at the position of the coordinates (m, n) in a local region R3 of the same shape as the search region R1, using the coordinates (a, b) in the search region as a base point. The position of the corresponding image is defined by changing the coordinates (a, b) of the base point and finding the position at which the total value C (a, b) of the brightness difference is minimized.

Because the search image R1 is extracted within the reference image (the right image) and the corresponding image R4 corresponding to the target object is extracted within the left image by the processing in step S12, next, the position of the center of gravity of the search image R1, the position of the center of gravity of the corresponding image R4, and the parallax Δd (as a number of pixels) are determined, and the distance z between the vehicle 10 and the target object is calculated by applying a formula (5) shown below (step S13).

$$z = \frac{B \times F}{\Delta d \times p} \quad (5)$$

Here, B is the base line length, that is, the distance in a horizontal direction between the center position of the imaging element of the infrared camera 2R and the center position of the imaging element of the infrared camera 2L (the spacing between the optical axes of both infrared cameras); F is the focal length of the lenses of the infrared cameras 2R and 2L, and p is the pixel separation in the imaging elements of the infrared cameras 2R and 2L.

A method for calculating the distance to the target object is described in detail below.

Once the calculation of the turning angle θr in step S10 and the calculation of the distance to the target object in step S13 are completed, the coordinates (x, y) in the image and the distance z calculated by the formula (5) are applied to a formula (6) below, and converted to real space coordinates (X, Y, Z) (step S14).

Here, as shown in FIG. 2, the real space coordinates (X, Y, Z) are fixed as shown in the figure, with the position of the middle point between the mounting positions of the infrared cameras 2R and 2L (the positions at which they are fixed on the vehicle 10) deemed the origin O, and the coordinates in the image are defined as x in the horizontal direction and y in the vertical direction, with the center of the image serving as the origin.

$$\begin{bmatrix} X \\ Y \\ Z \end{bmatrix} = \begin{bmatrix} xc \times z/f \\ yc \times z/f \\ z \end{bmatrix} \quad (6)$$

$$f = F/p$$

Here, (xc, yc) are the coordinates (x, y) of the right image which have been converted to coordinates in a virtual image in which the real space origin O and the center of the image have been made to coincide based on the relative positional relationship between the mounting position of the infrared camera 2R and the real space origin O. Furthermore, f is the ratio between the focal length F and the pixel separation p.

Furthermore, once the real space coordinates are obtained, turning angle compensation is performed in order to compensate for the positional shift in the image caused by the turning of the vehicle 10 (step S15).

Figure 10:
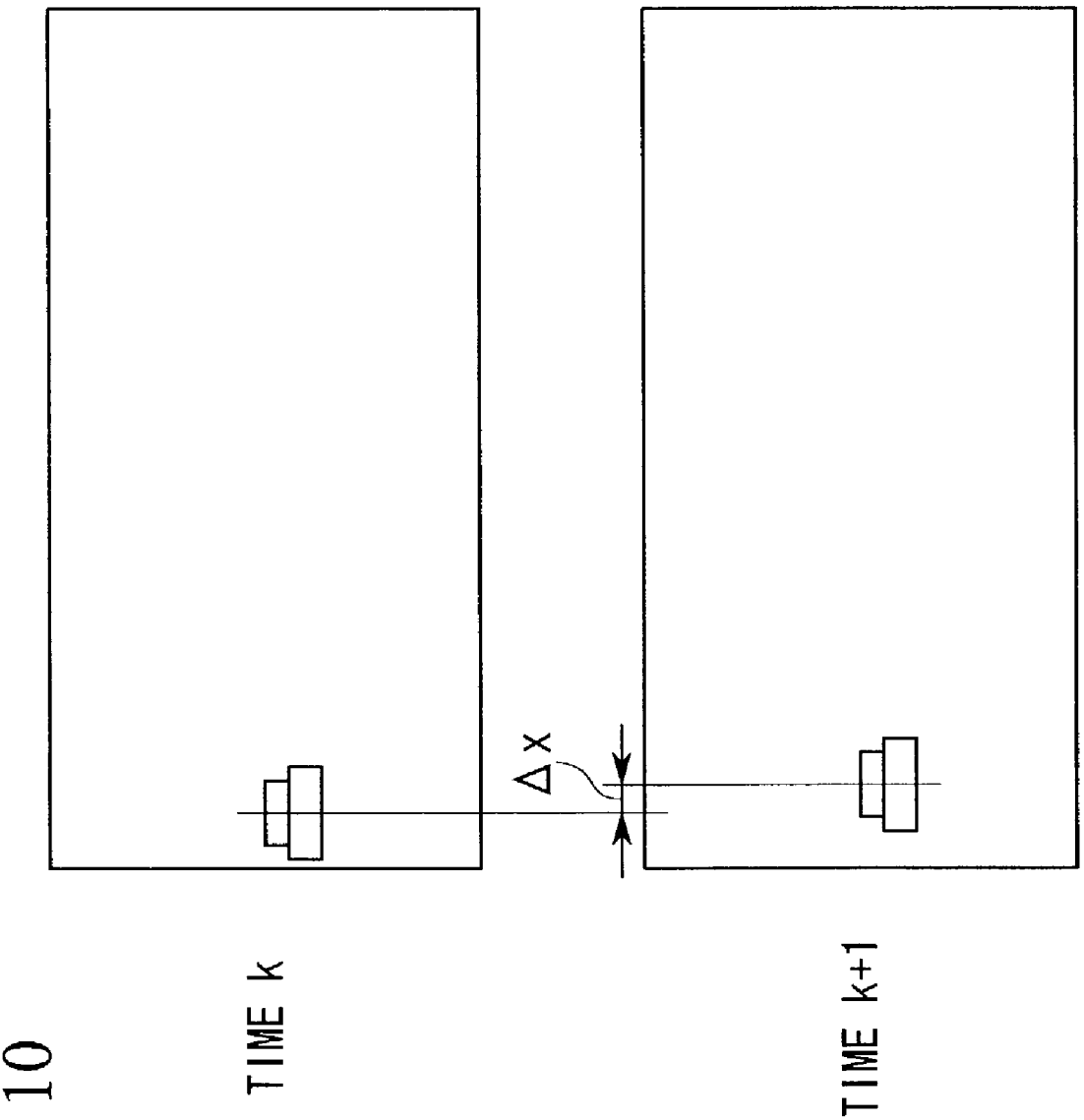
FIG. 10 is a diagram showing the shift in the position of a target object in an image which occurs due to turning of the vehicle.

As shown in FIG. 7, for example, if the vehicle 10 turns to the left by a turning angle of θr during the interval from time k to time (k+1), then a shift in the x direction by an amount equivalent to Δx as shown in FIG. 10 occurs in the image obtained by the camera, and the turning angle compensation is a process to compensate for this shift. Specifically, the real space coordinates (X, Y, Z) are applied to a formula (7) below, and the compensated coordinates (Xr, Yr, Zr) are calculated. The calculated real space position data (Xr, Yr, Zr) is stored in the memory, associated with each target object. In the description below, the coordinates after turning angle compensation are shown as (X, Y, Z).

$$\begin{bmatrix} Xr \\ Yr \\ Zr \end{bmatrix} = \begin{bmatrix} \cos\theta r & 0 & -\sin\theta r \\ 0 & 1 & 0 \\ \sin\theta r & 0 & \cos\theta r \end{bmatrix} \begin{bmatrix} X \\ Y \\ Z \end{bmatrix} \quad (7)$$

Once the turning angle compensation for the real space coordinates has been completed, next, an approximately straight line LMV corresponding to the relative motion vector of the target object and the vehicle 10 is calculated from N pieces of real space position data (for example, N=10) after turning angle compensation, obtained for the same object during the monitoring period ΔT, that is, from the time series data (step S16).

Specifically, if the direction vector L which indicates the direction of the approximately straight line LMV is equal to (1x, 1y, 1z) where (|L|=1), then the straight line shown by the formula (8) below is determined.

$$X = u \cdot lx + Xav \quad (8)$$
$$Y = u \cdot ly + Yav$$
$$Z = u \cdot lz + Zav$$
$$Xav = \sum_{j=0}^{N-1} X(j)/N$$
$$Yav = \sum_{j=0}^{N-1} Y(j)/N$$
$$Zav = \sum_{j=0}^{N-1} Z(j)/N$$

Here, u is a parameter which takes an arbitrary value, and Xav, Yav, and Zav are the average values of the X coordinate, Y coordinate, and Z coordinate of the real space position data sequence, respectively.

When the parameter u is removed, formula (8) becomes formula (8a).

$$(X-Xav)/1x=(Y-Yav)/1y=(Z-Zav)/1z \quad (8a)$$

Furthermore, if, for example, P(0), P(1), P(2), ..., P(N−2), P(N−1) denote the time series data after turning angle compensation, then the approximately straight line LMV passes through the average position coordinates Pav= (Xav, Yav, Zav) of the time series data, and is found as a straight line wherein the average value of the square of the distance from each of the data points is minimal.

Here, the numerical values within the parentheses added to P, which denote the coordinates of each of the data points, indicate that the larger the value, the older the data. For example, P(0) indicates the most recent position coordinates, P(1) indicates the position coordinates from one sample cycle back, and P(2) indicates the position coordinates from two sample cycles back.

Next, when the most recent position coordinates P(0) equals (X(0), Y(0), Z(0)), the position coordinates P(N−1) =(X(N−1), Y(N−1), Z(N−1)) of the sample from (N−1) samples previous (time ΔT previous) is compensated to a position on the approximately straight line LMV. Specifically, by applying the Z coordinates Z(0), Z(N−1) to the formula (8a) above, that is, by using a formula (9) below, the position coordinates after compensation Pv(0)=(Xv(0), Yv(0), Zv(0)) and Pv(N−1)=(Xv(N−1), Yv(N−1), Zv(N−1)) are obtained.

$$Xv(j) = Z(j) - Zav) \times \frac{lx}{lz} - Xav \quad (9)$$
$$Yv(j) = Z(j) - Zav) \times \frac{ly}{lz} - Yav$$
$$Zv(j) = Z(j)$$
$$j = 0, N-1$$

A relative motion vector is obtained as a vector directed from the position coordinates Pv(N−1) calculated in formula (9) towards Pv(0).

By determining the relative motion vector in this manner, by calculating an approximately straight line which approximates the relative motion locus of the target object relative to the vehicle 10 based on a plurality (N pieces) of data within the monitoring period ΔT, the influence of position detection errors can be reduced, and it is possible to more accurately predict the possibility of a collision with the target object.

Furthermore, once the relative motion vector is determined in step S16, next, a warning determination process which determines the possibility of a collision with the detected target object is performed (step S17).

Figure 11:
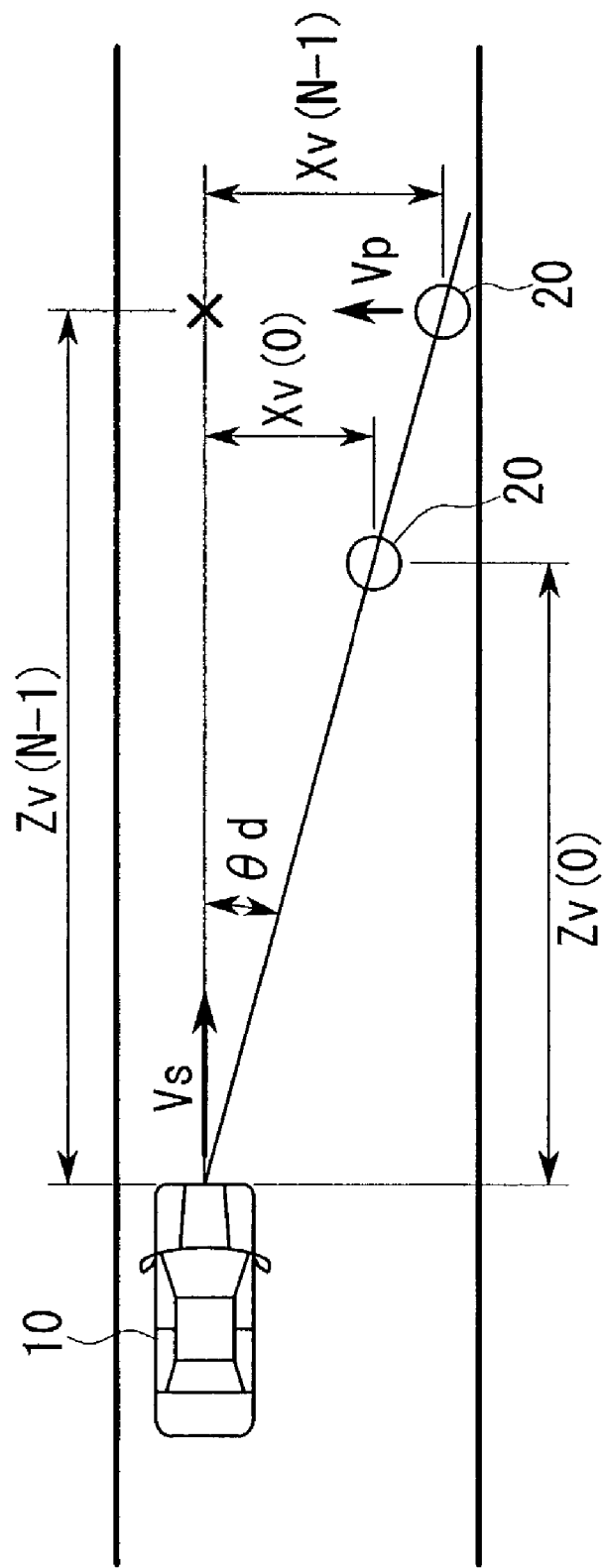
FIG. 11 is a diagram showing a case in which a collision may easily occur.

The warning determination process (step S17) is processing which, by using any one of collision determination processing, processing to determine whether or not a target object is in an approach determination region, or intrusion collision determination processing, each of which is described below, determines the possibility of the vehicle 10 colliding with the detected target object. The description below uses an example as shown in FIG. 11, in which an animal 20 is approaching the path of the vehicle at a velocity Vp from a substantially 90° angle relative to the direction of forward motion of the vehicle 10.

<Collision Determination Processing>

First, the image processing unit 1 calculates the relative velocity in the Z direction Vs using a formula (10) shown below and the fact that the animal 20 has approached to a distance Zv(0) from a distance Zv(N−1) during a time ΔT, and performs collision determination processing. In collision determination processing, a collision is considered likely when the formulas (11) and (12) below are true.

$$Vs=(Zv(N-1)-Zv(0))/\Delta T \quad (10)$$

$$Zv(0)/Vs \leq T \quad (11)$$

$$|Yv(0)| \leq H \quad (12)$$

Here, Zv(0) is the most recent distance detection value (the label v is attached in order to indicate that this is data after compensation using the approximately straight line LMV, while the Z coordinate is a value identical to that before compensation), and Zv(N−1) is the distance detection value at the time ΔT previous. Furthermore, T is a margin time which signifies that the possibility of a collision is determined time T before the predicted collision time, and accordingly, T is set to a value of approximately 2 to 5 seconds, for example. Furthermore, H is a predetermined height which defines the range of the Y direction, that is the height direction, and is set to about twice the height of the vehicle 10, for example.

<Processing to Determine whether or not a Target Object is in an Approach Determination Region>

Figure 12:
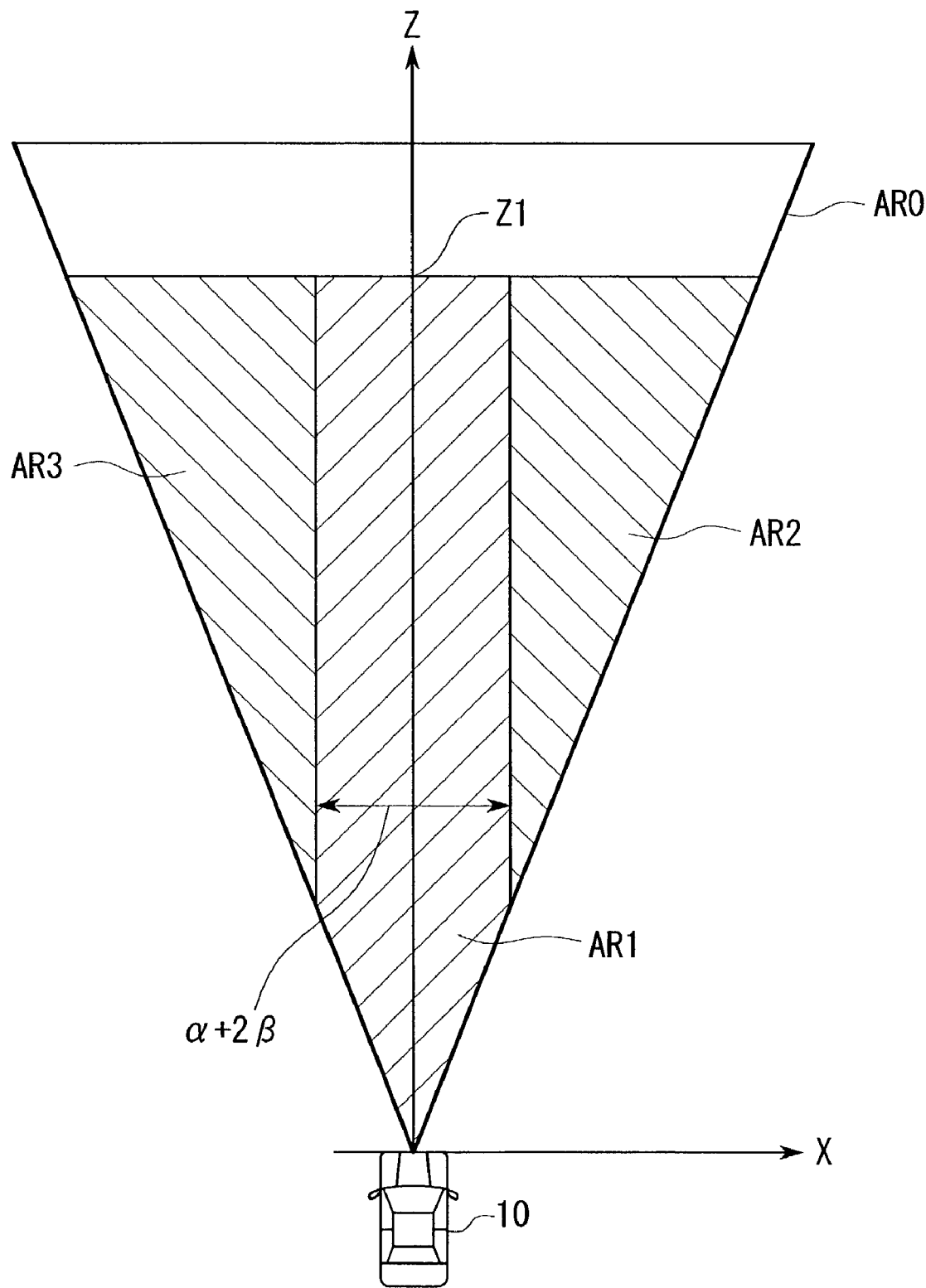
FIG. 12 is a diagram showing the region division in front of a vehicle.

Here, a determination is made as to whether or not a target object lies within the approach determination region. For example, in FIG. 12, the region which can be monitored by the infrared cameras 2R and 2L is indicated by an outer triangular region AR0 indicated by the bold solid line, and the regions AR1, AR2, and AR3 inside the region AR0, which are within a distance of Z1=Vs×T from the vehicle, serve as the warning determination regions.

Here, AR1 is a region corresponding with a range produced by adding a margin of β (for example approximately 50 to 100 cm) to both sides of the width α of the vehicle 10, or in other words, a region having a width of (α/2+β) on both sides of a central axis positioned along the center in the width direction of vehicle 10, and if the target object remains in this region the possibility of a collision is extremely high, and consequently this region is called an approach determination region. The regions AR2 and AR3 are regions (on the outside of the approach determination region in a transverse direction) in which the absolute value of the X coordinate is larger than the approach determination region, and because intrusion collision determination, described below, is performed on target objects inside these regions, they are called intrusion determination regions. These regions have a predetermined height H in the Y direction, as shown in formula (12) above.

<Intrusion Collision Determination Processing>

Specifically, in intrusion collision determination processing, a determination is made as to whether or not the difference between xc(0) (the character c, as described above, is appended in order to signify that it is a coordinate on which compensation has been performed to make the center position of the image align with the real space origin O), which is the most recent x coordinate on the image, and xc(N−1), which is the x coordinate at a time ΔT previous, satisfies a formula (13) shown below. If the formula is satisfied, it is determined that the possibility of a collision is high.

$$\frac{-\alpha \cdot f}{2}\left(\frac{1}{Zv(0)} - \frac{1}{Zv(N-1)}\right) \leq \tag{13}$$

$$xc(0) - xc(N-1) \leq \frac{\alpha \cdot f}{2}\left(\frac{1}{Zv(0)} - \frac{1}{Zv(N-1)}\right)$$

As shown in FIG. 11, in the case of an animal 20 which is approaching the path of the vehicle from a substantially 90° angle relative to the direction of forward motion of the vehicle 10, when Xv(N−1)/Zv(N−1)=Xv(0)/Zr(0), or in other words, when the ratio of the velocity Vp of the animal to the relative velocity Vs of the vehicle is Vp/Vs=Xr(N−1)/Zr(N−1), the azimuth angle θd at which the animal 20 is viewed from the vehicle 10 becomes constant, and the possibility of a collision is high. The formula (13) determines this possibility while taking into account the width a of the vehicle 10.

In the warning determination processing (step S17), if the determination is made in all of the collision determination processing, the processing to determine whether or not a target object is in the approach determination region, and the intrusion collision determination processing, that there is no possibility of a collision between the vehicle 10 and the detected target object (NO in step S17), then the processing returns to step S1, and the processing described above is repeated.

Furthermore, in the warning determination processing (step S17), if a determination is made by any one of the collision determination processing, the processing to determine whether or not a target object is in the approach determination region, or the intrusion collision determination processing, that there is a possibility of a collision between the vehicle 10 and the detected target object (YES in step S17), then the process proceeds to the warning output determination processing of step S18.

In step S18, a warning output determination process, that is, a process to determine whether or not to output a warning, is performed (step S18).

In the warning output determination process, a determination is made as to whether or not the driver of the vehicle 10 is performing a braking action based on the output BR of the brake sensor 5.

If the driver of the vehicle 10 is performing a braking action, the acceleration Gs (positive in the deceleration direction) generated thereby is calculated, and if this acceleration Gs is larger than a predetermined threshold value GTH, it is determined that a collision can be avoided by the braking action, the warning output determination processing completes (NO in step S18), the process returns to step S1, and the processing described above is repeated.

Consequently, when an appropriate braking action has been performed, no warning is issued, and the driver will suffer no undue distress.

Furthermore, if the acceleration Gs is equal to or less than the predetermined threshold GTH, or of the driver of the vehicle 10 has not performed a braking action, then the flow immediately proceeds to the processing in step S19 (YES in step S18). Because the possibility of contact with the target object is high, a warning by speech is issued via the speaker 6 (step S19), and an image obtained, for example, by the infrared camera 2R is output to the image display apparatus 7, and the approaching target object is displayed to the driver of the vehicle 10 as a highlighted image (step S20).

The predetermined threshold value GTH is determined by a formula (14) shown below. This is the value corresponding with the condition in which the vehicle 10 stops at a travel distance equal to or less than the distance Zv(0) when the acceleration Gs is maintained without change during the braking action.

$$GTH = \frac{Vs^2}{2 \times Zv(0)} \tag{14}$$

Next, the parallax calculation processing in step 13 in the flowchart shown in FIG. 3 is described with reference to the flowchart shown in FIG. 13 and the drawings in FIG. 14.

Figure 13:
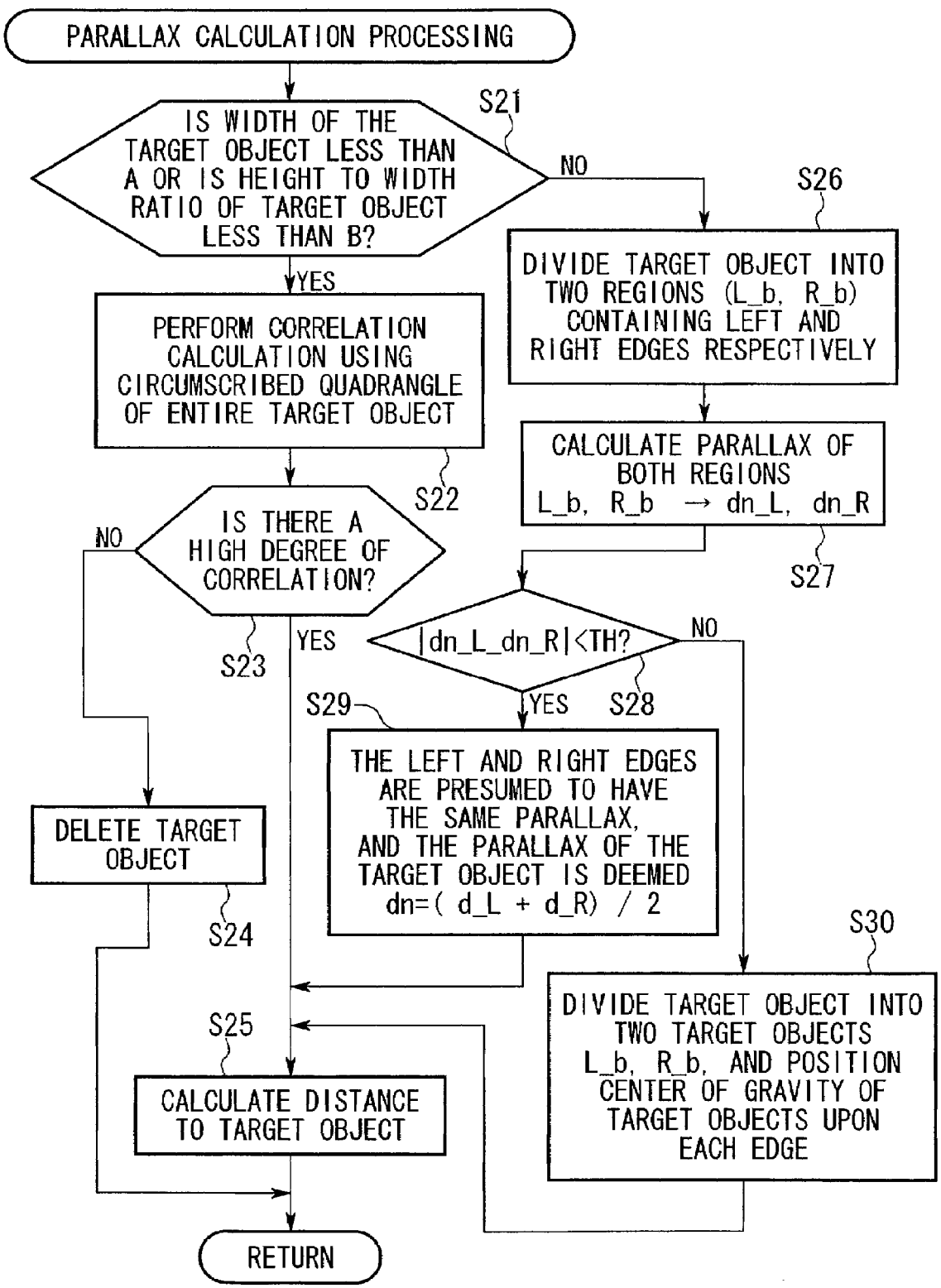
FIG. 13 is a flowchart showing the operation of parallax calculation processing in the same embodiment.

FIG. 13 is a flowchart showing the operation of the parallax calculation processing.

Figure 14:
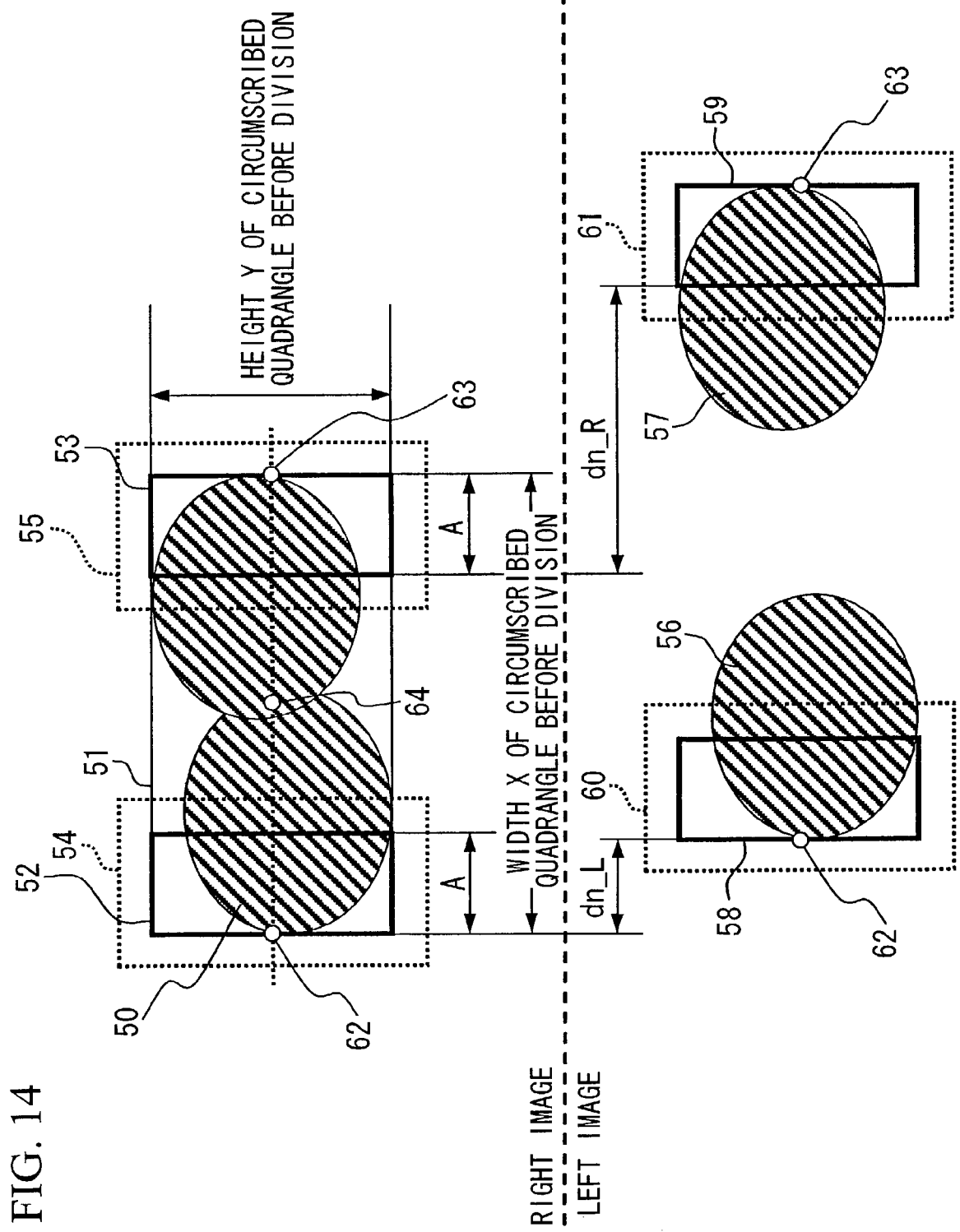
FIG. 14 is a diagram showing the right image and the left image during the parallax calculation processing of the same embodiment.

In FIG. 13, first, the image processing unit 1 determines, for a target object such as the target object 50 shown in the right image in FIG. 14, if either the width X of a circumscribed quadrangle 51 of the target object 50 is less than a predetermined value A, or if the ratio of the length in the vertical direction (height Y) to the length in the transverse direction (width X) of the circumscribed quadrangle 51 is greater than a predetermined value B (step S21), that is whether width X of the circumscribed quadrangle 51<A, or (height Y of the circumscribed quadrangle 51/width X of the circumscribed quadrangle 51)>B In step S21, if the width X of the circumscribed quadrangle 51 is less than the predetermined value A, or if the ratio of the length in the vertical direction (height Y) to the length in the transverse direction (width X) of the circumscribed quadrangle 51 is greater than the predetermined value B (YES in step S21), then the image processing unit 1 executes correlation calculation on the grayscale image using the entire circumscribed quadrangle 51 of the target object 50 in the right image and the left image (step S22).

Next, in the image processing unit 1, a determination is made based on the results of the correlation calculation executed in step S21, as to whether or not there is a high degree of correlation between the target object 50 in the right image and the target object 50 in the left image (step S23).

In step S23, if there is a low degree of correlation between the target object 50 in the right image and the target object 50 in the left image (NO in step S23), this target object is eliminated as an object for detection (step S24).

Furthermore, in step S23, if there is a high degree of correlation between the target object 50 in the right image and the target object 50 in the left image (YES in step S23), the distance to the target object is calculated using the formula (5) above (step S25).

On the other hand, if in step S21, the width X of the circumscribed quadrangle 51 is equal to or greater than the predetermined value A, and the ratio of the length in the vertical direction (height Y) to the length in the transverse direction (width X) of the circumscribed quadrangle 51 is equal to or less than the predetermined value B (NO in step S21), then the image processing unit 1 predicts the likelihood of overlapping of the target object, and as shown in the right image in FIG. 14, the target object is divided into two regions, namely a divided region L_b52 and a divided region R_b53, containing the left and right edges of the target object respectively (step S26). Here, the widths of the divided region L_b52 and the divided region R_b53 are set to widths equal to the predetermined value A from the left and right edges, respectively, and the heights are set to the height Y of the circumscribed quadrangle 51 prior to division.

Next, as shown in the right image in FIG. 14, correlation calculation blocks 54 and 55 are set around the periphery of the divided regions L_b52 and R_b53 respectively, and, as shown in the left image in FIG. 14, correlation calculations are then performed with correlation calculation blocks 60 and 61 set around target objects 56 and 57 in the left image which correspond to the target object 50 in the right image, and the parallax dn_L and the parallax dn_R respectively are calculated (step S27). Once the respective parallaxes dn_L and dn_R are found, a determination is made in the image processing unit 1 as to whether or not the absolute value of the difference between the parallax dn_L and the parallax dn_R in the calculated parallax amounts (dn_L, dn_R) is less than a predetermined value TH (step S28), that is, whether or not the formula |dn_L−dn_R|<TH is true.

In step S28, if the absolute value of the difference between the parallax dn_L and the parallax dn_R is less than the predetermined value TH (YES in step S28), then a determination can be made that the left and right edges of the target object have the same parallax, and that a state in which different objects overlap has not occurred. Consequently, instead of dividing the target object and then performing recognition, the target object parallax is calculated as dn=(d_L+d_R)/2, the process proceeds to step S25, and the distance to the target object is calculated using the formula (5) above (step S25).

Furthermore, in step S28, if the absolute value of the difference between the parallax dn_L and the parallax dn_R is equal to or greater than the predetermined value TH (NO in step S28), then a determination can be made that the parallaxes of the left and right edges of the target object are different, and that the target object consists of different objects which overlap. Consequently, the target object is divided into two target objects 56 and 57 of Lb and Rb for recognition. At this time, as shown in the right image and the left image in FIG. 14, the centers of gravity of the respective target objects (a left edge target object center of gravity 62, and a right edge target object center of gravity 63) are set to the edges of the divided regions L_b52, 58 and the divided regions R_b53, 59 in the transverse direction, and set to the same height as the target object center of gravity 64 prior to division in the height direction (step S30).

The process then proceeds to step S25, and the distance to each of the respective target objects is calculated using formula (5) above (step S25).

In step S30 described above, of the objects which are overlapping, those which are unnecessary may be eliminated as target objects for detection.

Furthermore, the above embodiment was described using a case in which a determination was made as to whether a target object consists of different objects overlapping, and in the case of overlap, the target object was divided into two target objects for recognition. However, it is also possible, for a single target object which is long in the distance direction, to determine by the same method, the difference in parallax caused by differences in the position on the target object which occur because the object is long in the distance direction, and then accurately estimate the position of the target object.

In addition, the embodiment described above used an example in which the front of the vehicle was monitored, but any other direction, such as the rear of the vehicle, may also be monitored.

Furthermore, the present invention is not limited to the embodiment described above, and many variations are possible. For example, in the embodiment described above, infrared cameras were used as the imaging devices for obtaining images of the target object, but it is also possible to use a video camera which can detect only standard visible light, as disclosed in Japanese Unexamined Patent Application, First Publication No. Hei 9-226490. However, because it is possible to simplify the extraction processing of animals or moving vehicles by using infrared cameras, the present invention can be realized using a computing unit with even relatively low computing capacity.

Furthermore, in the present embodiment, the image processing unit 1 includes an extraction region setting device, a search region setting device, an object recognition device, and a parallax calculation device. More specifically, step S21 in FIG. 13 corresponds to an image prediction device, and steps S26 through S30 corresponds to an image determination device. In addition, step S30 corresponds to an image separation device.

As described above, in an image recognition apparatus of the present embodiment, even if two different overlapping objects are extracted by binary processing as a single target object, the distance to the respective edges can be calculated from the parallax of the left and right edges of the target object.

Consequently, it is possible to determine based on the difference in the distances to the left and right edges that different objects are overlapping within the target object, and then accurately estimate the position of the target object based on the position of the edge points of respective target objects (objects) and the distance to the edge points of the respective target objects. Furthermore, using the same method it is also possible to accurately calculate the position of not only overlapping objects, but also target objects which are long in the distance direction, by measuring the positions of the left and right edges.

What is claimed is:

1. An image recognition apparatus which measures the parallax of a target object based on images respectively obtained by two imaging devices and calculates the distance to the target object based on the parallax, the image recognition apparatus comprising:

said two imaging devices;

an image determination device which sets determination regions which have sufficient height to include the target object and independently contain left and right edges of the target object respectively, and determines whether different objects are overlapping by measuring and comparing the parallax of a determination region containing the left edge with the parallax of a determination region containing the right edge; and an image prediction device which predicts the overlap of different objects if a region surrounding the target object is larger than a predetermined size, or a ratio of a length in the vertical direction to a length in the horizontal direction of the region surrounding the target object is less than a predetermined value.

2. An image recognition apparatus according to claim 1, wherein when the prediction device does not predict the overlap of different objects, the image determining device does not set determination regions or determine whether different objects are overlapping.

3. An image recognition apparatus according to claim 1, wherein the image determination device sets calculation regions containing the determination regions on the periphery of each determination region respectively, and calculates the parallaxes by performing a correlation calculation between the calculation regions corresponding with respective images obtained by the two imaging devices.

4. An image recognition apparatus according to claim 1, wherein the image determination device determines that different objects are overlapping when an absolute value of a difference between the parallax of the detemlination region containing the left edge and the parallax of the determination region containing the right edge is greater than a predetermined value.

5. An image recognition apparatus which measures the parallax of a target object based on images respectively obtained by two imaging devices and calculates the distance to the target object based on the parallax, the image recognition apparatus comprising:

said two imaging devices;

an image determination device which sets determination regions which have sufficient height to include the target object and independently contain left and right edges of the target object respectively, and determines whether different objects are overlapping by measuring and comparing the parallax of a determination region containing the left edge with the parallax of a determination region containing the right edge; and an image prediction device which predicts the overlap of different objects if a region surrounding the target object is larger than a predetermined size, or a ratio of a length in the vertical direction to a length in the horizontal direction of the region surrounding the target object is less than a predetermined value;

wherein the image determination device includes an image separation device which, when the overlapping of different objects is recognized, sets distance determination points in the determination regions upon the edges of the determination regions, and independently calculates the distance to each of the respective objects.

* * * * *